C. M. HENDERSHOTT.
ELEVATING TRUCK.
APPLICATION FILED SEPT. 15, 1919.

1,346,710. Patented July 13, 1920.

WITNESSES
H. C. Hebig
S. W. Foster

INVENTOR
C. M. HENDERSHOTT
BY Munn & Co.
ATTORNEYS

UNITED STATES PATENT OFFICE.

CHAUNCEY M. HENDERSHOTT, OF HORNELL, NEW YORK.

ELEVATING-TRUCK.

1,346,710.  Specification of Letters Patent.  Patented July 13, 1920.

Application filed September 15, 1919. Serial No. 323,771.

*To all whom it may concern:*

Be it known that I, CHAUNCEY M. HENDERSHOTT, a citizen of the United States, and a resident of the city of Hornell, in the county of Steuben and State of New York, have invented a new and Improved Elevating-Truck, of which the following is a full, clear, and exact description.

This invention relates to improvements in elevating trucks, an object of the invention being to provide a truck with an improved mounting for a platform, and improved means for elevating the same.

A further object is to provide a truck of the character stated which is of great simplicity, which can be easily operated, and which will be of maximum strength and durability.

A further object is to provide a truck in which the platform may be given any elevation desired, and which when elevated will securely support the load thereon.

With these and other objects in view, the invention consists in certain novel features of construction and combinations and arrangements of parts as will be more fully hereinafter described and pointed out in the claims.

In the accompanying drawings:—

Figure 1:
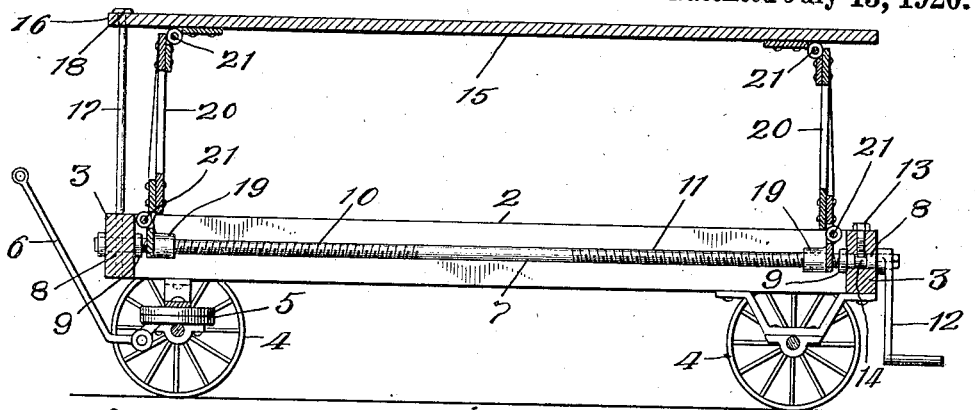
Figure 1 is a view in longitudinal section illustrating the platform in elevated position.
Figure 2:
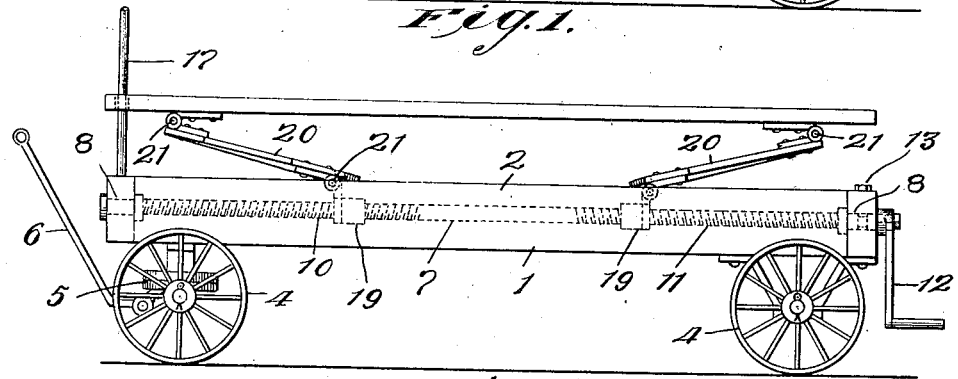
Fig. 2 is a view in side elevation showing the platform partially elevated.
Figure 3:
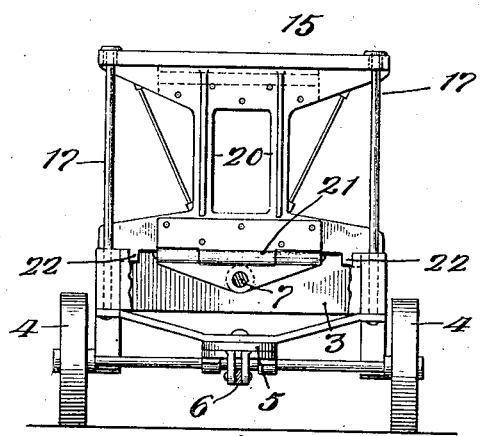
Fig. 3 is a view in end elevation with the platform fully elevated.

1 represents a supporting frame, preferably of the general rectangular shape shown, comprising side bars 2 and end bars 3 secured together in any approved manner.

The frame 1 is supported on wheels 4, the front wheels connected by a turn table 5 with the frame and having a handle 6 to steer the truck as it is moved from place to place.

An adjusting rod 7 extends longitudinally of the frame 1, is mounted in bearings 8 in the ends 3 and provided with shoulders 9 to prevent longitudinal movement of the frame.

The rod is provided with right and left hand screwthreads 10 and 11 at opposite sides of its center, and a crank arm 12 is secured on one end of the rod to turn the same.

A set screw 13 is located in one end bar 3 and projects into a groove 14 in the rod and assists in holding the rod against longitudinal movement.

15 represents a platform which is the same shape as frame 1, and is provided at one end with openings 16 receiving guide standards 17 fixed to frame 1 and having heads 18 at their upper ends limiting the upward movement of the platform.

Internally screwthreaded sleeves 19 are mounted on the threaded portions 10 and 11 of the rod 7 and are caused to move toward and away from each other according to the direction of rotation of the rod.

Risers 20 are connected by relatively wide hinges 21 with the sleeves 19 and these risers have their lower edges positioned to engage and rest upon the side bars 2 of the frame 1, and are made with the lugs 22 engaging the inner faces of the sides 2, and preventing possibility of lateral displacement.

The risers 20 are preferably of skeleton form and may be constructed in any desired manner to give the necessary strength and rigidity with the least possible weight. Their upper edges bear against the platform 15 throughout its width and give the maximum support thereto.

When the rod 7 is turned in one direction it will cause the sleeves 19 to move apart and through the medium of the risers 20 will elevate the platform 15. When the rod is turned in the opposite direction the platform will be lowered, and while of course the maximum of strength is had when the platform is in its extreme positions, it may be adjusted to any height desired within the two extremes of movement.

Various slight changes might be made in the general form of the parts described without departing from my invention, and hence I do not limit myself to the precise details set forth but consider myself at liberty to make such slight changes and alterations as fairly fall within the spirit and scope of the appended claims.

I claim:—

1. A truck of the character stated, comprising a wheeled frame, a rod supported longitudinally in the frame and having right and left screwthreads thereon, sleeves on the threaded portions of the rod, a platform, and risers hingedly connected to the platform and sleeves, and having their lower edges projecting across and supported on the frame when the platform is elevated.

2. A truck of the character stated, comprising a wheeled frame, a rod supported longitudinally in the frame and having right and left hand screwthreads thereon, a platform, risers hingedly connected to the platform and sleeves, said risers engaging the platform throughout its width and resting on said frame when the platform is elevated, and lugs on the risers engaging the inner faces of the frame.

3. A truck, comprising a wheeled frame, standards on the frame, a platform above the frame and having openings therein receiving the standards, risers hingedly connected to the lower face of the platform, means movable longitudinally of the frame for moving the risers from an angular or horizontal position to a vertical position to elevate the platform, and said risers at their outer ends supported on the frame.

CHAUNCEY M. HENDERSHOTT.